US006697360B1

(12) United States Patent
Gai et al.

(10) Patent No.: US 6,697,360 B1
(45) Date of Patent: *Feb. 24, 2004

(54) METHOD AND APPARATUS FOR AUTO-CONFIGURING LAYER THREE INTERMEDIATE COMPUTER NETWORK DEVICES

(75) Inventors: Silvano Gai, Vigliano d'Asti (IT); Keith McCloghrie, San Jose, CA (US); Yakov Rekhter, New Rochelle, NY (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/145,600

(22) Filed: Sep. 2, 1998

(51) Int. Cl.[7] .............................................. H04L 12/56
(52) U.S. Cl. ....................... 370/389; 370/401; 370/475; 709/220
(58) Field of Search ................................. 370/389, 392, 370/400, 401, 469, 395.5, 395.54, 471, 474, 475; 709/208, 220, 221, 222, 223, 226

(56) References Cited

U.S. PATENT DOCUMENTS

| 5,287,103 A | | 2/1994 | Kasprzyk et al. | |
|---|---|---|---|---|
| 5,835,725 A | | 11/1998 | Chiang et al. | |
| 5,951,649 A | * | 9/1999 | Dobbins et al. | ............. 370/351 |
| 6,009,474 A | * | 12/1999 | Lu et al. | ........................ 707/1 |
| 6,018,767 A | * | 1/2000 | Fijolek et al. | ............... 709/218 |
| 6,049,826 A | * | 4/2000 | Beser | .......................... 709/222 |
| 6,286,038 B1 | * | 9/2001 | Reichmeyer et al. | ........ 709/220 |

OTHER PUBLICATIONS

Taniguchi, K. and Nishida, T., DSCP: Dynamic Subnet Configuration Protocol <draft–eitf–dhc–dyn–subnet–conf–00.txt>, Network Working Group, Internet Draft, Mar. 18, 1997, pp. 1–8.

McCloghrie, K. and Rose, M., Management Information Base for Network Mangement of TCP/IP–based internets: MIB–II, Network Working Group, Request For Comments: 1213, Obsoletes: RFC 1158, Mar. 1991, pp. 1–10.

Moy, J., OSPF Version 2, Network Working Group, Request for Comments: 1583, Obsoletes: 1247, Mar. 1994, pp. 1–10.

Malkin, G., RIP Version 2 Carrying Additional Information, Network Working Group, Request for Comments: 1723, Obsolets: 1388, Nov. 1994, pp. 1–9.

(List continued on next page.)

Primary Examiner—Douglas Olms
Assistant Examiner—Bob A. Phunkulh
(74) Attorney, Agent, or Firm—Cesari and McKenna, LLP; Michael R. Reinemann

(57) ABSTRACT

A method and apparatus for auto-configuring layer 3 intermediate devices in computer networks by extending the Dynamic Host Configuration Protocol (DHCP). The devices generate, transmit and receive DHCP messages having novel options embedded therein. The options permit a layer 3 device to request and receive from a DHCP server a unique, overall IP address that may be assigned to the device. The device may also request and receive one or more IP subnets and corresponding IP addresses for each of its interfaces. The device may further receive the routing protocols to be used on the various subnets. The layer 3 device can thus be auto-configured with IP configuration parameters, including IP subnets, IP addresses and routing protocols without the time-consuming, manual involvement of a network administrator.

22 Claims, 7 Drawing Sheets

OTHER PUBLICATIONS

Hedrick, C., Routing Information Protocol, Network Working Group, Request for Comments: 1058, Jun. 1988, pp. 1–10.

Baker, F. and Coltun, R., OSPF Version 2 Management Information Base, Network Working Group, Request for Comments: 1850, Obsoletes: 1253, Nov. 1995, pp. 1–10.

Interior Gateway Routing Protocol, Internetworking Technologies Handbook, Feb. 20, 2002, Chapter 42, pp. 1–4.

Enhanced IGRP, Internetworking Technologies Handbook, Apr. 10, 2002, Chapter 40, pp. 1–6.

B. Croft and J. Gilmore; Request for Comments (RFC): 951 *Bootstrap Protocol* (*BOOTP*) (Sep. 1995).

R. Droms; Request for Comments (RFC): 2131 *Dynamic Host Configuration Protocol* (Mar. 1997).

*Cisco DNS/DHCP Manager Overview* (Corp. 1989–1997).

J. Wobus; *DHCP Freqently Asked Questions* (*FAQ*) (Jun. 12, 1998).

D. Tabor, Jr.; *BOOTP and DHCP, Lesson 23* (New Jersey Institute of Technology, Nov. 22, 1995).

W. Lazear; *The Autonomous System Option for DHCP* Networking Working Group, Internet Draft (Jan. 1998).

S. Alexander and R. Droms; Request for Comments (RFC): 2132 *DHCP Options and BOOTP Vendor Extensions* (Mar. 1997).

\* cited by examiner

| CODE | LEN | TYPE | NUMBER | NAME |
|------|-----|------|--------|------|
| 402  | 404 | 406  | 408    | 410  |

| CODE | LEN | $a_1$ $a_2$ $a_3$ $a_4$ | $p_a$ | $b_1$ $b_2$ $b_3$ $b_4$ | $p_b$ | ... | $n_1$ $n_2$ $n_3$ $n_4$ | $p_n$ |
|------|-----|-------------------------|-------|-------------------------|-------|-----|-------------------------|-------|
| 422  | 424 | 426                     |       | 426                     |       |     | 426                     |       |

| CODE | LEN | PROTOCOL | PARAMETERS |
|------|-----|----------|------------|
| 432  | 434 | 436      | 438        |

FIG. 4C (430)

METHOD AND APPARATUS FOR AUTO-CONFIGURING LAYER THREE INTERMEDIATE COMPUTER NETWORK DEVICES

FIELD OF THE INVENTION

The present invention relates generally to computer networks, and more specifically, to a method and apparatus for auto-configuring layer 3 devices with network configuration parameters.

BACKGROUND OF THE INVENTION

A computer network typically comprises a plurality of interconnected entities. An entity may consist of any device, such as a host or a node, that "sources" (i.e., transmits) or "sinks" (i.e., receives) data frames. A common type of network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack), such as the Open Systems Interconnection (OSI) or the Transport Control Protocol/Internet Protocol (TCP/IP) Reference Models. In many instances, LANs of one or more companies, each referred to as a subnetwork, may be interconnected by point-to-point links, microwave transceivers, satellite hook-ups, etc. to form a wide area network ("WAN"), an internet or a larger network that may span an entire campus, country or continent.

One or more intermediate devices are often used to couple LANs together and allow the corresponding entities to exchange information. For example, a switch may be utilized to provide a "switching" function for transferring information, such as data frames, among entities of a computer network. Typically, the switch is a computer and includes a plurality of ports that couple the switch to several LANs and to other switches. The switching function includes receiving data at a source port from an entity and transferring that data to at least one destination port for receipt by another entity.

Switches may operate at various levels of the communication protocol stack. For example, a switch may operate at layer 2 which, in the OSI Reference Model, is called the data link layer. Data frames at the data link layer typically include a header containing the Media Access Control (MAC) address of the entity transmitting the message (source address) and the MAC address of the entity to whom the message is being sent (destination address). To perform the switching function, layer 2 switches examine the MAC destination address of each data frame received on a source port. The frame is then switched onto the destination port or ports associated with that MAC destination address. Layer 2 switches typically do not perform any modification to the data frames being switched and, therefore, are only used to interconnect subnetworks operating the same data link layer standard (e.g., Ethernet).

A MAC address is 48 bits long and is uniquely associated with the network interface card that resides within the entity and provides the connectivity to the network. In particular, each manufacturer of network interface cards is provided with a block of available MAC addresses from a central authority. The manufacturer then assigns to each network interface card a particular MAC address from its authorized block. The MAC address of a particular network interface card thus does not change over time, even though the corresponding entity (or possibly just the network interface card) may be moved from one subnetwork to another. Moreover, upon initialization, an entity may poll its network interface card and learn its MAC address.

Other devices, including switches, may operate at higher communication layers, such as layer three of the OSI Reference Model which is called the network layer. In TCP/IP Model, the network layer corresponds to the Internet Protocol (IP). Data frames at the network or IP layer also include a header. For TCP/IP, the network header contains the IP source address of the entity transmitting the data frame and the IP destination address of the entity to whom the message is being sent. Layer 3 switches typically strip away the data link headers from received data frames to reveal the IP or network header. Layer 3 switches may re-assemble or convert received data frames from one data link format (e.g., Ethernet) to another (e.g. token ring). Thus, layer 3 switches are often used to interconnect dissimilar subnetworks.

Each host or node implementing the TCP/IP protocol stack typically has only one network connection and is therefore assigned a single IP address. A layer 3 switch, however, typically has multiple ports each connected to the network. Associated with each port or physical connection, moreover, may be one or more logical connections or interfaces that provide connectivity between the IP software layer and the data link software layer. These interfaces may each be assigned a different IP address. Thus, a single layer 3 switch typically has many different IP addresses.

An IP version 4 address is 32 bits long and consists of a network number followed by a host number. The network number corresponds to the particular network on which the host resides and is used for routing purposes. The host number is used to address an individual entity located on the corresponding network. Network numbers are assigned from a central authority and each network number uniquely identifies a specific network. Host numbers are assigned by the local network administrator using any desired method. The combination of network number and host number results in a unique IP address across all networks. Nonetheless, unlike MAC addresses, there is nothing inherent in the configuration of an entity (like a particular network interface card) which determines its IP address.

A given network, moreover, may be divided into several parts called subnets for internal routing purposes. With subnets, the original host number is split into a subnet number and a new host number. The resulting IP address now includes a network number (which has not changed), a subnet number and a host number. Each entity on the same subnet has the same subnet number. To entities outside the network subnetting is not visible, since the network number of all entities on all subnets has not changed. Thus, subnetting allows an organization to segregate its various departments (e.g., marketing, engineering, etc.) without having to obtain new network numbers or change any external databases.

To determine which portion of an IP address corresponds to a subnet, a subnet mask is provided. The subnet mask is a 32 bit combination. By ANDing the subnet mask with the IP address, a device, such as a layer 3 switch, may learn the subnet number of the corresponding IP address. The number of available host numbers for a given subnet, moreover, depends on the number of bits selected to represent the subnet number. As additional hosts are added to a subnet, a network administrator may run out of available host numbers, requiring the assignment of a new subnet number and host number to all of the hosts. Also, if a large subnet is assigned to only a few hosts, valuable host numbers will be wasted. Planning for and implementation of subnets is thus an important task which demands substantial time and energy of network administrators.

When an entity wishes to send a message to another entity, upper layers of the communication software build a message packet and hand the packet along with the IP address of the recipient to the IP software layer for transmission. The IP address of the recipient may be learned through the well-known Domain Name System. Before passing the message packet down to the data link layer, the IP layer needs to determine the corresponding MAC address of the recipient. Typically, the IP layer utilizes the Address Resolution Protocol (ARP) to identify a MAC address based on a given IP address. With ARP, a device broadcasts a message asking which entity owns a given IP address. The broadcast will arrive at every entity on the corresponding subnetwork and each entity will check its IP address. The entity having the requested IP address will respond with its MAC address. The IP layer will then use the returned MAC address when handing the message down for further processing by the data link layer.

Another protocol, known as the Reverse Address Resolution Protocol (RARP), is used to identify the corresponding IP address for a given MAC address. With RARP, an entity broadcasts a message asking whether any entity knows the IP address for a given MAC address. RARP is often used by an entity to learn its own IP address by broadcasting a RARP request containing its own MAC address. RARP requests, however, are not forwarded beyond the transmitting entity's subnetwork. That is, layer 3 switches, which are typically used to interconnect multiple subnetworks, do not forward RARP requests which, by definition, contain a limited broadcast address. Accordingly, a given entity will not receive a reply to its RARP request unless another an entity that knows the requested IP address (e.g., an RARP server) is located on the requester's subnetwork. To overcome this problem and to allow entities to learn other configuration parameters beyond their IP address, the Bootstrap Protocol (BOOTP) was developed. BOOTP uses the User Data Protocol (UDP) a connectionless transport protocol provided by the TCP/IP Model.

More specifically, the BOOTP protocol defines BOOTP servers, BOOTP clients and BOOTP relay agents. BOOTP servers contain a database of IP addresses manually assigned to various MAC addresses by a network administrator. An entity utilizing BOOTP formulates a UDP request message which is broadcast to an IP address and a predefined BOOTP "server" transport-layer port number. The UDP request is forwarded by BOOTP relay agents (at least one of which is located on each subnetwork) to the BOOTP server. The BOOTP server formulates a UDP reply message to the entity that may be unicast or broadcast along with a predefined BOOTP "client" transport-layer port number. The reply message contains the requesting entity's IP address as well as other IP or network layer configuration parameters, such as the address and path for a server having a file containing start-up (boot) information, the address of a default router, etc.

An improvement over BOOTP is the Dynamic Host Configuration Protocol (DHCP) which is defined at Request for Comments (RFC) 2131 from the Dynamic Host Configuration Working Group of the Internet Engineering Task Force (IETF). DHCP, like BOOTP, is built upon a client-server model, where DHCP servers allocate IP addresses and deliver network configuration parameters to DHCP clients. With DHCP, however, IP addresses are dynamically assigned to hosts upon request from a cache of IP addresses maintained by the DHCP servers. This frees the network administrator from having to manually assign IP addresses. Each IP address, moreover, is only assigned for a limited period of time (referred to as lease). Since IP addresses can be a scarce resource, the utilization of leases prevents entities from keeping IP addresses longer than needed. The DHCP protocol, which also utilizes UDP, defines a set of specific messages that are exchanged between DHCP clients and DHCP servers.

To obtain IP configuration parameters, including an IP address, a DHCP client (e.g., a host or node) broadcasts a DHCPDISCOVER message, which is received and forwarded by DHCP relay agents (similar to BOOTP relay agents) to one or more DHCP servers. The DHCP servers each respond with a DHCPOFFER message that is unicast to the client's MAC address and offers an IP address with a corresponding lease time, a subnet mask (if applicable) and the IP address of the DHCP server sending the offer, among other information. The DHCP client evaluates the various offers it receives and selects one by broadcasting a DHCPREQUEST message. The selected DHCP server then responds with a DHCPACK message that is unicast to the client officially assigning the selected IP and providing additional network configuration parameters to the client. After receiving its IP address and configuration parameters, a DHCP client is able to exchange messages with any other host on the network. When a host's lease is about to expire, it may issue another DHCPREQUEST message asking that its lease be extended. The DHCP server may respond with a DHCPACK message granting a new lease time.

DHCP messages, whether originating from a DHCP client or a DHCP server, have the same general format. FIG. 1 is a block diagram of a DHCP message 100. The message 100 includes a plurality of fields, including a 1 octet operation_requested (op) field 102 (e.g., request or reply), a 1 octet hardware_type (htype) field 104 and a 1 octet hardware_address_length (hlen) field 106. Additional fields include a 1 octet hops field 108, which allows configuration via relay agents, and a 4 octet transaction_id (xid) field 110, which is a random number used by the client and the server to associate a set of DHCP messages. Other fields include a 2 octet seconds (secs) field 112, indicating the time elapsed since the client started the configuration process, a 2 octet flags field 114 and a 4 octet client_IP_address (ciaddr) field 116 which is filled in only where the client knows its IP address already. Still other fields include a 4 octet your_IP_address (yiaddr) field 118, which contains the client's IP address as provided by the DHCP server, a 4 octet server_IP_address (siaddr) field 120, which contains the IP address of a boot server (which may or may not be the server sending the message 100), a 4 octet relay_agent_address (giaddr) field 122, which contains the IP address of the device acting as the host's relay agent, a 16 octet client_hardware_address (chaddr) field 124, containing the 48 bit MAC address of the client, a 64 octet server_name (sname) field 126 and a 128 octet file_name (file) field 128, which is loaded by the DHCP server with the directory-path name of a file containing IP configuration parameters for use by the client during initialization or boot-up. In addition, the message 100 includes an options field 130 of variable length which may contain any number of options as added by the DHCP server or client. All of the DHCP messages, such as DHCPDISCOVER, DHCPOFFER, DHCPREQUEST and DHCPACK, have the same general format as shown in FIG.

1. In addition, every DHCP message includes a DHCP message type option 132 in options field 130 whose contents identify the corresponding type of DHCP message (e.g., DHCPDISCOVER, DHCPOFFER, etc.).

Although it represents an improvement in the assignment of IP addresses, the DHCP protocol is specifically limited to host computers. That is, DHCP: is neither intended nor designed for use in configuring layer 3 devices. Specifically, layer 3 devices, which are critical to internetwork communication, are typically deemed too important to allow their configuration be manually performed. Thus, although layer 3 devices can act as relay agents passing DHCP messages between DHCP clients and DHCP servers, the switch itself must be manually configured by the network administrator. With the growth in utilization of layer 3 devices, such as layer 3 switches, in many network implementations, however, manual configuration has become time-consuming and remains error prone.

SUMMARY OF THE INVENTION

It is an object of the present invention to provide a method and apparatus for automatically configuring layer 3 devices.

It is a further object of the present invention to provide a method and apparatus for dynamically configuring layer 3 devices.

It is a further object of the present invention to provide an extension to the Dynamic Host Configuration Protocol to support the auto-configuration of layer 3 devices.

It is another object of the present invention to allocate and re-assign subnets depending on their utilization.

Briefly, the invention relates to a method and apparatus for auto-configuring layer 3 devices in computer networks. The method relates to a novel extension of the Dynamic Host Configuration Protocol (DHCP). In particular, a DHCP server and one or more layer 3 devices are enhanced to generate, transmit and receive DHCP messages having novel options embedded therein. Through these novel options, a layer 3 device can request and receive from the DHCP server a unique, overall IP address for association with that device. The device may also request and receive one or more IP addresses and corresponding subnets, as necessary, for each of its interfaces. The device may further receive the routing protocols to be used on the various subnets. Accordingly, a layer 3 device may be auto-configured with its IP subnets, IP addresses and routing protocols without the time-consuming, manual programming of a network administrator.

Specifically, the invention includes a novel request/reply option that may be embedded within a DHCP message. The request/reply option preferably includes a type field that may be loaded by a layer 3 device with a particular value depending on the information being requested. That is, by entering different values in the type field, the layer 3 device may request a unique, overall IP address, one or more IP addresses for a particular interface, or a new subnet (and corresponding IP address) for an interface not yet associated with any particular subnet. Another option carries IP address and subnet information for the device's interfaces. A third option is used to convey routing protocol information between DHCP servers and layer 3 devices. The routing parameter option preferably includes a protocol field. By examining the contents of the protocol field, the layer 3 device learns which routing protocol (e.g., Open Shortest Path First) to use within the associated subnetwork. The invention further includes a new DHCP message type that may be exchanged between layer 3 devices and DHCP servers. The new message type invalidates the device's network configuration parameters at one or more interfaces, causing it to solicit new IP configuration parameters.

In a further embodiment of the invention, the enhanced DHCP server monitors the utilization of various subnets within the network and adjusts their sizes should the utilization exceed or drop below preset thresholds. For example, if the number of IP addresses assigned to a given subnet falls below 10% of its capacity, the enhanced DHCP server preferably establishes a new subnet that is one-half the size of the original subnet. The enhanced DHCP server then assigns each member-entity of the original subnet a new IP address corresponding to the new subnet. Similarly, if the utilization exceeds 40% of the subnet's capacity, the enhanced DHCP server preferably establishes a new subnet having approximately twice the size of the original subnet. Again, each member-entity of the original subnet is assigned a new IP address corresponding to the new subnet.

In the preferred embodiment, upon detecting the need for a new subnet whether larger or smaller, the server first assigns a new IP address from the new subnet to each layer 3 device coupled to the old subnet. During the re-assignment process, the layer 3 devices maintain both their old IP address and the new IP address. Next, the server stops renewing leases on the original subnet causing the member-entities to request new IP addresses. In response, the server assigns IP addresses from the new subnet to the member-entities. Next, the server transmits a reconfigure message resulting in the layer 3 device discarding its IP address from the old subnet. The old subnet is then released and made available for re-assignment within the network. As shown and described herein, utilization of present invention allows subnets to be dynamically adjusted depending on their utilization, thereby conserving IP address resources.

BRIEF DESCRIPTION OF THE DRAWINGS

The above and further advantages of the invention may be better understood by referring to the following description in conjunction with the accompanying drawings, in which:

FIGS. 4A–C are block diagrams of the message options used to auto-configure a layer 3 device.

DETAILED DESCRIPTION OF THE PREFERRED EMBODIMENT

Figure 2:
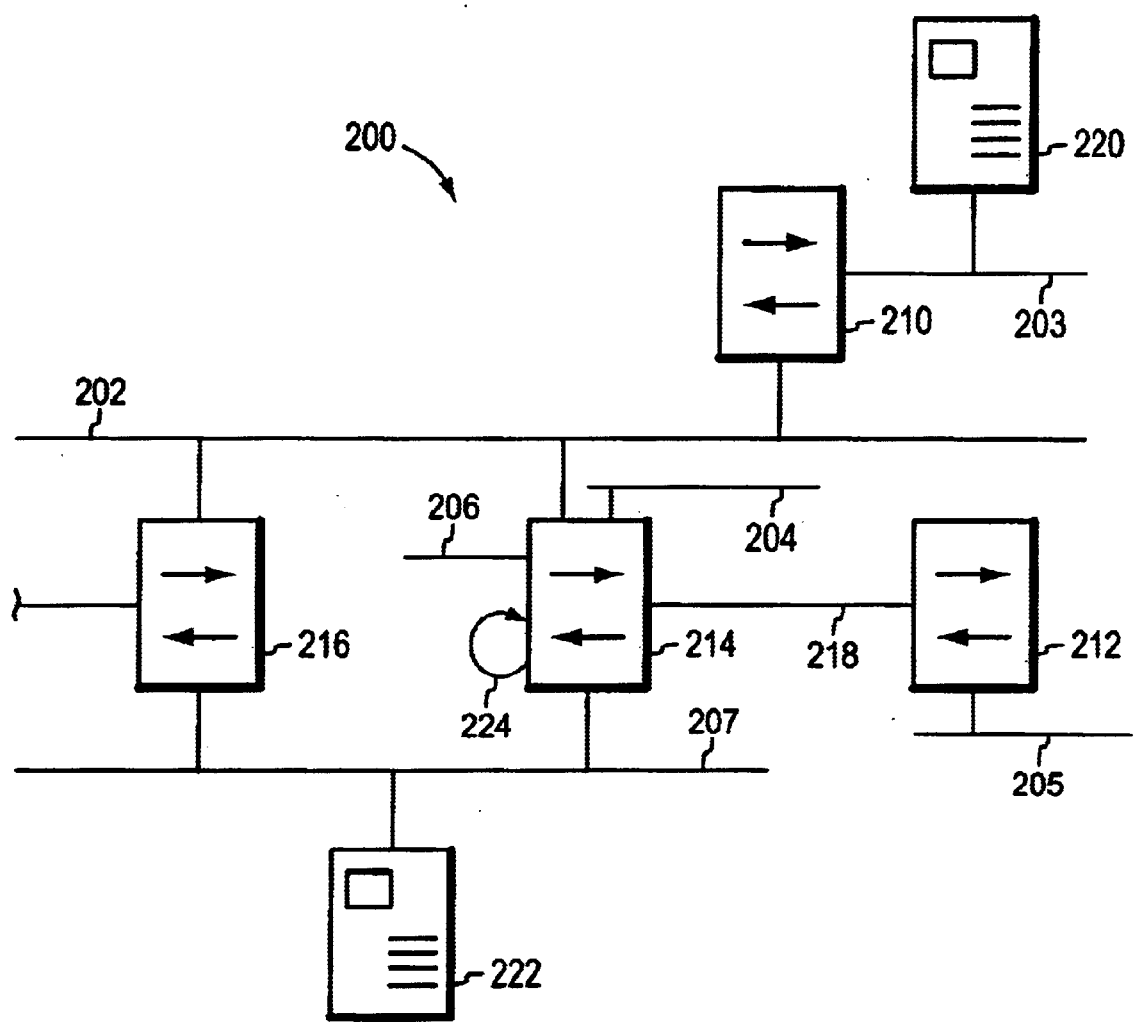
FIG. 2 is a highly schematic diagram of a computer network in accordance with the present invention.

FIG. 2 is a highly schematic block diagram of a computer network 200. The network 200 includes a plurality of subnetworks 202–207 which may be local area networks (LANs). Located on each subnetwork 202–207 are a plurality of hosts or nodes (not shown) configured to exchange information, such as data frames. The subnetworks 202–207 are interconnected by a plurality of intermediate devices 210–216. That is, each subnetwork 202–207 is coupled to at least one intermediate device 210–216 so that messages originating on one subnetwork may be forwarded to any other subnetwork. Particular intermediate devices, such as devices 214 and 212, may alternatively or additionally be interconnected by point-to-point links, such as link 218.

Each device 210–216, moreover, includes a plurality of ports which are coupled to subnetworks 202–207 or point-to-point links, such as link 218. The network 200 further includes a plurality of servers 220 and 222 each of which may be coupled to a different subnetwork 203 and 207, respectively.

Preferably, intermediate devices 210–216 are layer 3 devices. That is, devices 210–216 operate at the network layer of the communication protocol stack implemented within the network 200. In particular, devices 210–216 include an Internet Protocol (IP) software layer, as defined by the well-known Transport Control Protocol/Internet Protocol (TCP/IP) Reference Model. Thus, associated with each port or physical network connection is one or more logical connections or interfaces defined by the IP software layer. Additionally, each device, such as device 214, has a loopback interface 224, which may be used for testing and other purposes. In accordance with the present invention, the layer 3 devices 210–216 and servers 220 and 222 preferably implement an extension to the Dynamic Host Configuration Protocol (DHCP), as described herein, which operates to automatically configure the devices 210–216 with IP configuration parameters.

In the illustrated embodiment, the layer 3 devices 210–216 and servers 220, 222 are computers having transmitting and receiving circuitry and components, including network hardware cards having physical ports, for exchanging data frames. The devices 210–216 and servers 220, 222 further comprise programmable processing elements containing software programs pertaining to the methods described herein that are executable by the processing elements. Other computer readable media may also be used to store and execute the program instructions. The terms "layer 3 device" or "layer 3 switch" as used herein are intended broadly to cover any intermediate device operating at the network layer, including, without limitation, routers as defined by Request for Comments (RFC) 1812 from the Internet Engineering Task Force (IETF), intermediate devices that are only partially compliant with RFC 1812, intermediate devices that provide additional functionality (such as Virtual Local Area Network (VLAN) support, IEEE 802.1Q support and/or IEEE 802.1D support), etc.

It should be understood that less than all of the layer 3 intermediate devices and/or servers of the network 200 may implement the methods described herein. Furthermore, only a subset of a device's interfaces may be auto-configurable. In particular, each interface of an auto-configurable switch may have an auto-configuration flag which, if asserted, directs the switch to auto-configure the interface as described below. If the flag is un-asserted, the interface must be manually configured in a conventional manner.

It should also be understood that the network configuration of FIG. 2 is for illustrative purposes only and that the present invention will operate with other, possibly far more complex, network topologies.

Auto-Configuring the IP interfaces of a Layer 3 Device

Figure 3A:
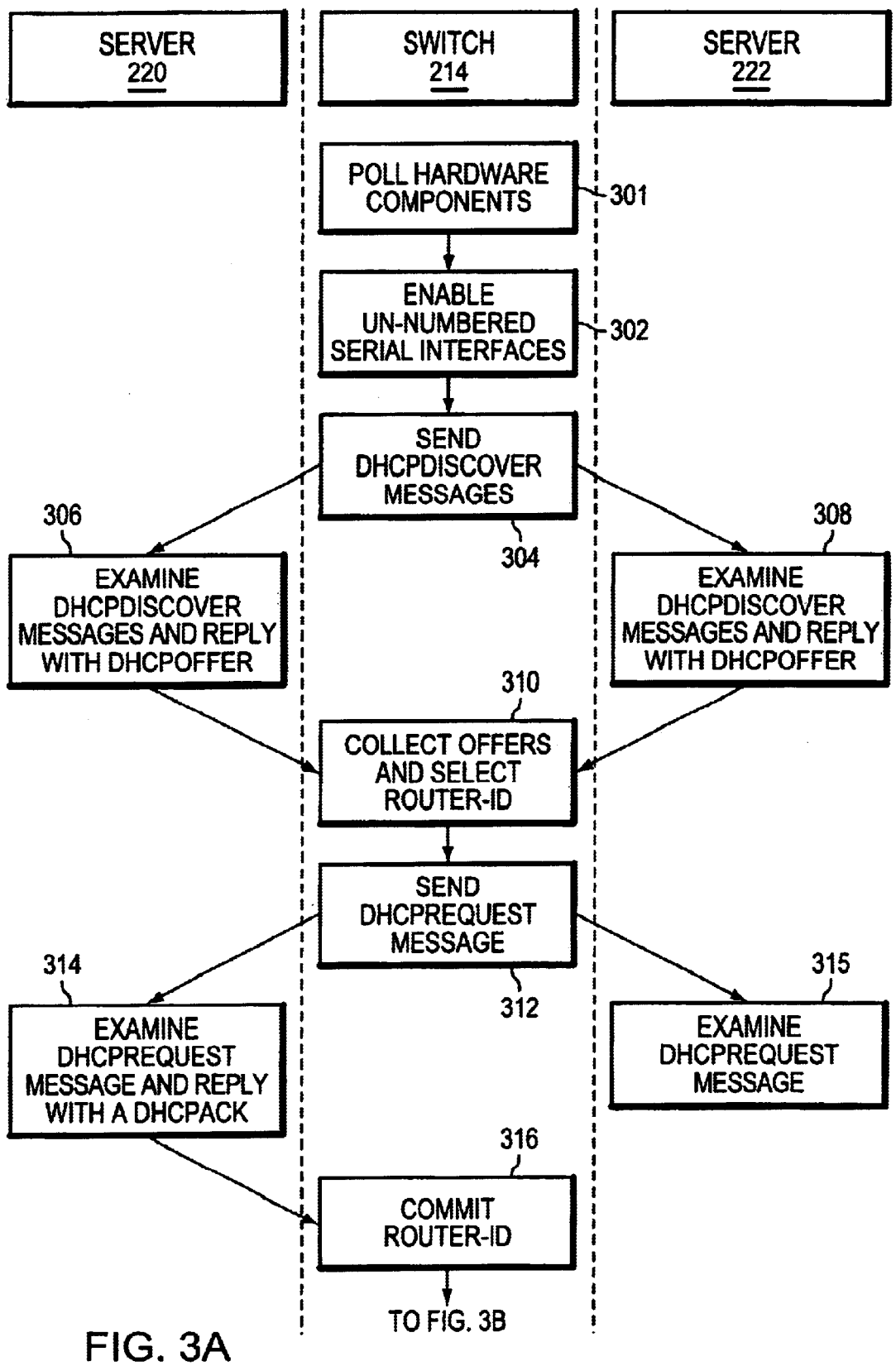
FIGS. 3A–3C are a flow diagram of the preferred method for auto-configuring a layer 3 device.
Figure 3B:
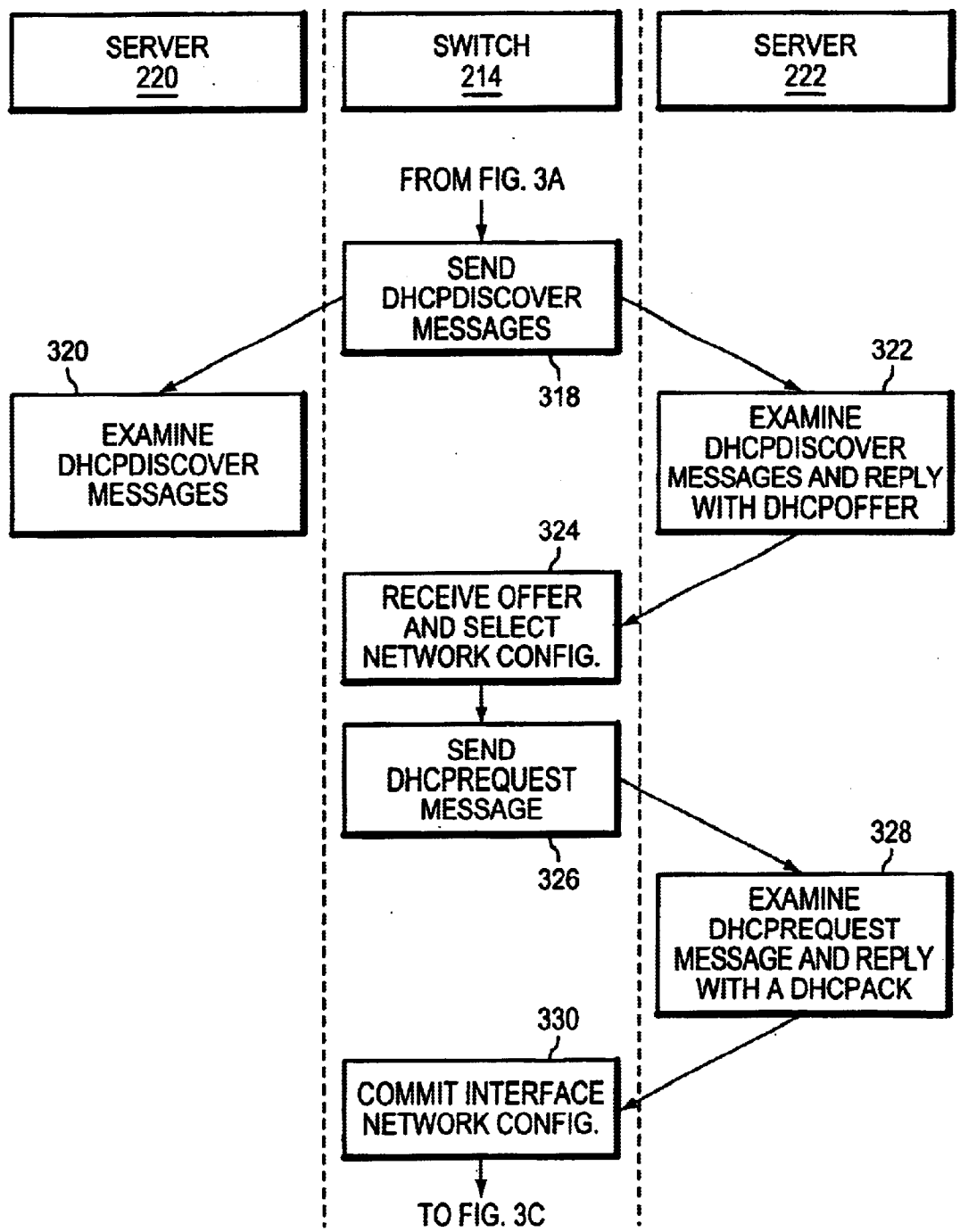
Figure 3C:
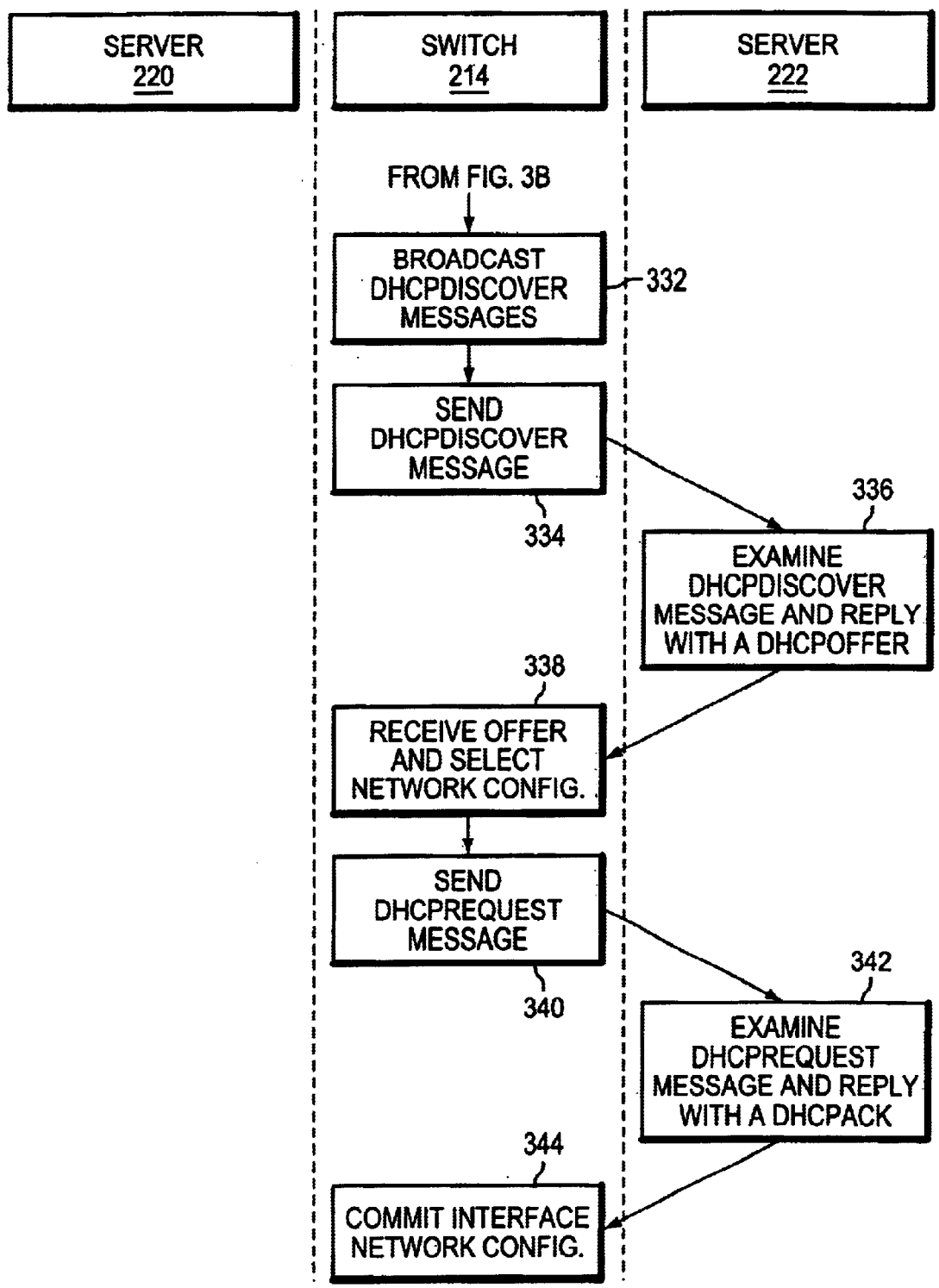

FIGS. 3A–3C are a flow chart of the sequence of steps taken and messages exchanged by a layer 3 device, such as device or switch 214, and one or more enhanced DHCP servers, such as servers 220, 222, during the auto-configuration process. Upon initialization, switch 214 polls each of its installed network hardware components in a conventional manner to determine their type (e.g., point-to-point wide area net work, local area network, etc.), as indicated by block 301. Polling also occurs when a new hardware component is added while the switch is running (e.g., a line card is "hot swapped" within the switch). Switch 214 then enables its serial interfaces (e.g., point-to-point wide area network interfaces) that can be configured as un-numbered point-to-point interfaces, as indicated by block 302. This includes serial interfaces utilizing layer 2 encapsulation protocols, such as High-Level Data Link Control (HDLC), Point-to-Point Protocol (PPP), Serial Line IP (SLIP), Frame Relay and Link Access Procedure Balanced (LAPB) as well as tunnel interfaces.

Furthermore, the TCP/IP software of switch 214 is preferably pre-configured to forward any IP packets that are delivered to any of its hardware addresses to its IP software layer, since there is no IP address associated with switch 214 at this point. For switch 212, which is coupled to switch 214 by point-to-point link 218 and also to LAN 205, the enabling of such serial interfaces and the forwarding of IP packets allows switch 212 to communicate with other portions of network 200 and receive configuration parameters, as described below.

Figure 1:
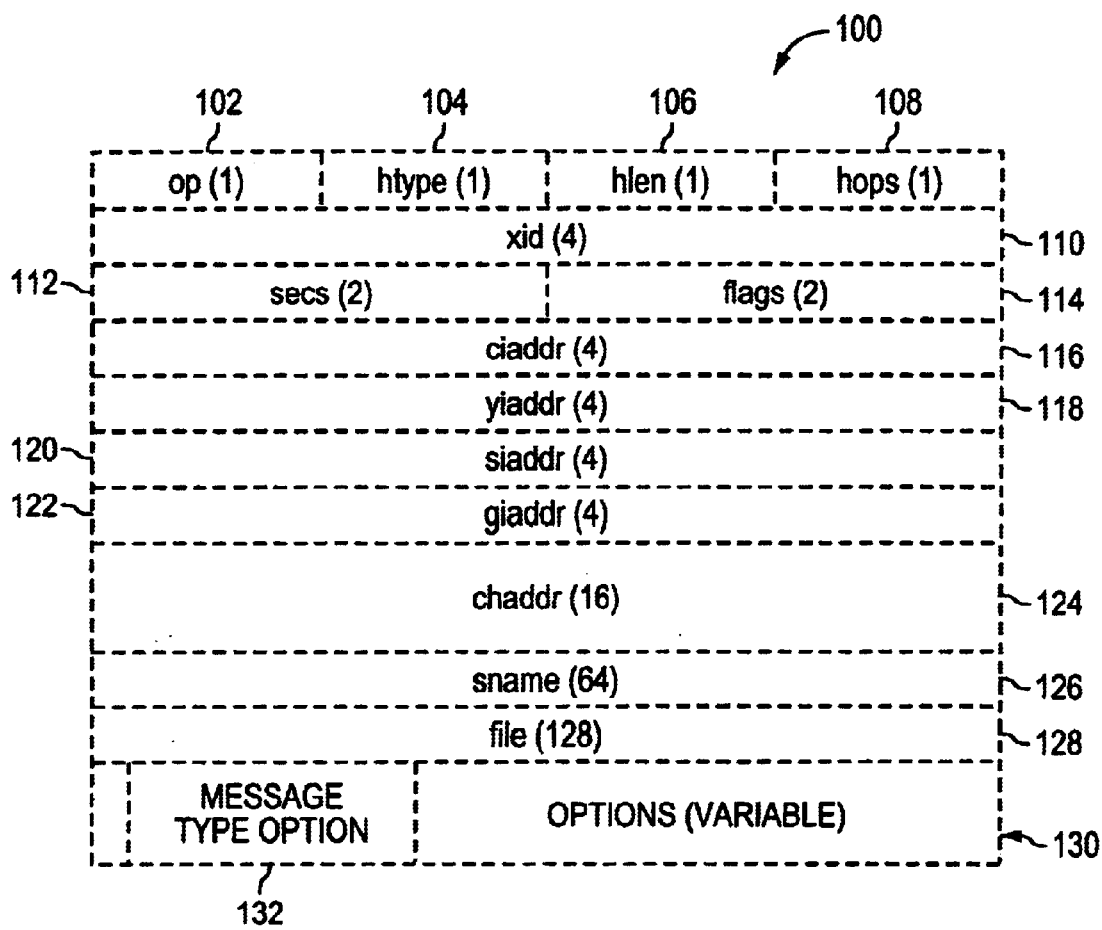
FIG. 1, previously discussed, is a block diagram illustrating the format of a conventional DHCP message.

Switch 214 next acquires a ROUTER-ID from one of the enhanced DHCP servers 220, 222. A ROUTER-ID is a stable, overall IP address used to uniquely identify the corresponding layer 3 switch, but which is not necessarily associated with any particular interface. To obtain a ROUTER-ID, switch 214 preferably generates and broadcasts a DHCPDISCOVER message from each of its interfaces, as shown at block 304. The format of the DHCPDISCOVER message is preferably in accordance with the DHCP message as shown in FIG. 1 and as defined at Request for Comments (RFC) 2131, which is hereby incorporated by reference in its entirety. In the DHCPDISCOVER message, the operation_requested field 102 is preferably set to "request", the flags field 114 is set to "broadcast" and the client_hardware_address field 124 is set to the corresponding MAC address through which the respective DHCPDISCOVER is being transmitted. That is, for DHCPDISCOVER messages being sent on subnetwork 204, field 124 is set to the MAC address of the switch port coupled to that subnetwork. The remaining fields of the DHCPDISCOVER message are preferably asserted or left un-asserted as provided in RFC 2131 for DHCPDISCOVER messages.

However, unlike conventional DHCPDISCOVER messages generated by hosts, each DHCPDISCOVER message generated by switch 214 for obtaining its ROUTER-ID includes a novel option, herein referred to as a DHCP router extension request/reply option, embedded within the options field 130 of the message. FIG. 4A illustrates a preferred format of the DHCP router extension request/reply option 400. Specifically, the router extension option 400 includes a plurality of fields, including a code field 402, a length field 404, a type field 406, a number field 408 and a name field 410. The code field 402 preferably contains a tag octet specifically identifying the option as a DHCP router extension request/reply option in accordance with Request for Comments (RFC) 2132 entitled "DHCP Options and BOOTP Vendor Extensions" (March 1997), which is hereby incorporated by reference in its entirety. The length field 404 contains a value corresponding to the length of option 400, not including code and length fields 402, 404.

The type field 406, which may be one octet in length, contains a value corresponding to the information requested (by a layer 3 switch) or provided (by an enhanced DHCP server) through the corresponding DHCP message. Switch 214 preferably loads the type field 406 with a particular value (e.g., "0") indicating that the corresponding DHCPDISCOVER message represents a request for a ROUTER-ID. The number and name fields 408, 410, which are discussed below, are preferably left un-asserted by switch 214.

DHCPDISCOVER messages with router extension option 400 set as indicated above are preferably broadcast in round robin fashion by switch 214 first on its unnumbered interfaces and then on its subnetwork or LAN interfaces. For example, switch 214 sends DHCPDISCOVER messages on link 218 first and then on each of its interfaces coupled to subnetworks 207, 206, 202 and 204. Since subnetworks 204 and 206 and link 218 do not provide connectivity to the enhanced DHCP servers 220 and 222, DHCPDISCOVER messages transmitted on these subnetworks and links do not reach servers 220, 222. The DHCPDISCOVER messages transmitted on subnetworks 202 and 207, however, are received by servers 220 and 222.

Switches 210 and 216 may also forward the DHCPDISCOVER message if they are configured in a conventional manner to act as DHCP relay agents. For example, switch 210 may received the DHCPDISCOVER messages broadcast on subnetwork 202. In response, switch 210 enters its IP address corresponding to subnetwork 202 into the relay_agent_address field 122 of the DHCPDISCOVER message, and forwards the message to server 220.

Servers 220 and 222 examine the received DHCPDISCOVER messages including the options field 130, as indicated at blocks 306 and 308 (FIG. 3A). Servers 220 and 222 are preferably pre-configured to recognize the tag octet loaded into the code field 402 of option 400 as specifying a router extension request/reply option. By examining the contents of type field 406, servers 220, 222 learn that the request is for a ROUTER-ID. In response, each of the enhanced-DHCP servers 220, 222 generates and sends a DHCPOFFER message back to switch 214, as also shown by blocks 306 and 308. The DHCPOFFER messages also assumes the format of the DHCP message of FIG. 1. In particular, the options field 102 is set to "reply" and the conventional server identifier option is loaded with the IP address of the respective server 220, 222 sending the DHCPOFFER message. Servers 220, 222 may also load their IP addresses in the server_IP_address field 120. Within the your_IP_address field 118 of the DHCPOFFER message, each server loads an IP address for use by the requesting switch as a ROUTER-ID. Specifically, the enhanced-DHCP servers 220, 222 are preferably pre-configured with a cache of IP addresses for exclusive allocation as ROUTER-IDs. These IP addresses, moreover, preferably have a specific subnet or prefix (i.e., the number of asserted bits in the subnet mask) to identify them as potential ROUTER-IDs.

Each DHCPOFFER message formulated by servers 220, 222 also includes a router extension request/reply option 400 embedded within the options field 130. For DHCPOFFER messages that are generated in response to requests for a ROUTER-ID, the type field 406 of the respective option 400 is preferably loaded with the value utilized in the DHCPDISCOVER message (e.g., "0"). Again, the number and name fields 408, 410 are preferably left un-asserted. Also included within the options field 130 of the DHCPOFFER is an option, as described in RFC 2132, containing the proposed lease time for the corresponding ROUTER-ID loaded into field 118. The proffered lease time should be significantly longer than the lease times offered with IP addresses provided to hosts and to IP addresses offered to switch interfaces, as described below. For example, the lease time for a ROUTER-ID may be approximately ten days. Other options, such as those providing renewal and rebinding times, as described in RFC 2131, may also be embedded within the options field 130 of the DHCPOFFER message.

Since the flags field 114 of the received DHCPDISCOVER messages was set, the DHCPOFFER messages are transmitted to an IP broadcast address. The DHCPOFFER messages are received at switch 214 and their contents are examined. Since these DHCPOFFER messages contain the router extension request/reply option 400 with a "0" loaded into the type field, switch 214 "knows" that these messages are in response to its DHCPDISCOVER messages and that the proffered IP address contained within field 118 is a proposed ROUTER-ID.

Although conventional DHCP servers also receive the DHCPDISCOVER messages from switch 214, they do not recognize router extension request/reply option 400 and simply ignore the option. These conventional DHCP servers, however, assume that the DHCPDISCOVER messages were transmitted by a host, and, in response, prepare and transmit a DHCPOFFER message to switch 214 in accordance with RFC 2131. Such DHCPOFFER messages do not contain the router extension request/reply option 400 and thus are simply ignored by switch 214.

As indicated at block 310, switch 214 collects the DHCPOFFER messages from the various enhanced DHCP servers and selects a particular ROUTER-ID from one of them (e.g., server 220). To announce its selection, switch 214 formulates and broadcasts a DHCPREQUEST message having the format of the message shown in FIG. 1, as shown by block 312. Specifically, switch 214 loads the client_IP_address field 116 with the selected ROUTER-ID and repeats the proffered lease time and loads the selected server's IP address within options contained in options field 130. Switch 214 also embeds the router extension request/reply option 400 in options field 130 and again loads the corresponding type field 406 with the same value (e.g., "0").

Servers 220, 222 receive the DHCPREQUEST message and, by examining the contents of the client_IP_address field 116, the type field 406 of option 400 and the server identifier option, determine that switch 214 has accepted the proffered ROUTER-ID from server 220, as indicated by blocks 314, 315. In response, server 220 sends a DHCPACK message to switch 214, as also indicated by block 314. The DHCPACK messages follow the format of the message of FIG. 1 and contain a copy of the chosen IP configuration parameters, including the IP address and corresponding lease time. The DHCPACK message need not include the router extension request/reply option. Upon receipt of the DHCPACK message, as indicated at block 316, the switch 214 commits its configuration in accordance with the network configuration parameters contained in the DHCPACK message and assigns the ROUTER-ID address to its loopback interface 224. IP packets received at any interface of the switch 214 that are addressed to its ROUTER-ID are passed to the IP software layer. Thus, the switch 214 is now reachable through its ROUTER-ID. Server 220 also stores the association of switch 214 with the selected ROUTER-ID in a database. Preferably, servers 220, 222 run a conventional DHCP database failure protocol to provide back-up in case any given server fails. The protocol may also prevent a ROUTER-ID from being assigned to more than one auto-configurable switch.

Switch 214 next proceeds to configure its interfaces coupled to the various subnetworks. In particular, as indicated at block 318 (FIG. 3B), switch 214 first formulates a DHCPDISCOVER message for transmission on each interface that provides connectivity from the corresponding subnetwork to one or more enhanced DHCP servers 220, 222. These interfaces are already associated with one or more subnets through operations of the upstream switches (e.g., switch 210 for subnetwork 202) or the upstream servers (e.g., server 222 for subnetwork 207). Accordingly, switch 214 only needs an IP address from the respective subnet(s) to complete its configuration. Switch 214 identifies this set of interfaces by determining where DHCPOFFERs were received in response to its requests for a ROUTER-ID. For example, switch 214 would have received DHCPOFFER messages on its interfaces associated with subnetworks 202 and 207. Accordingly, switch 214 proceeds with configuring these interfaces next. In particular, switch 214 generates and broadcasts a DHCPDISCOVER message on each of these interfaces. Alternatively, switch 214 may simply broadcast DHCPDISCOVER messages on all of its subnetwork interfaces.

As described in connection with block 304 (FIG. 3A), the client_IP_address field 116 of these DHCPDISCOVER messages is left un-asserted, and a router extension request/reply option 400 is embedded within the options field 130. The type field 406 of the respective option 400 is preferably set to another value (e.g., "1") indicating that the switch 214 is requesting an IP address from an existing subnet(s). Additionally, if the subnetwork has been assigned a name, the switch 214 preferably enters it in the name field 410. For example, if the subnetwork is logically associated with a specific Virtual Local Area Network (VLAN), the name of the VLAN may be loaded into field 410. These DHCPDISCOVER messages are then broadcast from the interfaces with server connectivity. The DHCPDISCOVER messages are received at servers 220, 222 which examine their contents and determine, based on the value entered in the type field 406 of option 400, that switch 214 is requesting an IP address from an existing subnet(s).

To identify the corresponding subnet(s), servers 220, 222 examine the contents of the relay_agent_address field 122, as shown at blocks 320, 322. More specifically, the relay_agent_address field 122 contains the IP address of the relay interface coupled to the subnetwork on which the DHCPDISCOVER message originated. By examining the contents of the relay_agent_address field 122 and performing a database look-up, servers 220, 222 identify the subnet(s) corresponding to this subnetwork. If the relay_agent_address field 122 is un-asserted, then the servers 220, 222 know that the requesting switch interface is on the same subnet as the server. Only the server responsible for the identified subnet(s) responds with a DHCPOFFER message.

Assuming server 222 is responsible for the given subnet, it responds to switch 214 with a DHCPOFFER message, as also shown at block 322 (FIG. 3B). The DHCPOFFER message has the proposed IP address for the respective subnetwork interface loaded in the your_IP_address field 116. Server 222 also embeds the router extension option 400 within the options field 130 of the DHCPOFFER message. The type field 406 of the router extension option 400 is preferably loaded with the same value (e.g., "1") to indicate that the corresponding DHCPOFFER message contains a proffered IP address for the respective subnetwork interface. The number field 408 is also set to the number of IP subnets and addresses being proffered. For example, if the server is providing three IP addresses for the given interface, the number field 408 is preferably loaded with a "3". If a subnetwork name was provided by switch 214, it is repeated in field 410. The DHCPOFFER message also includes two additional novel options within their options field 130.

In particular, the DHCPOFFER message includes a variable length IP address bearer option. FIG. 4B illustrates a preferred embodiment of an IP address bearer option 420, which may include a plurality of fields, including a code field 422, a length field 424 and one or more IP/Subnet_pair fields 426. The code field 422 contains a tag octet identifying the option as a IP address bearer option. Each IP/Subnet_pair field 426 contains a proffered IP address and its corresponding subnet mask or prefix. Specifically, each IP/Subnet_pair field 426 includes five subfields. The first four subfields (e.g., $a_1$, $a_2$, $a_3$ and $a_4$) are preferably each 1 octet (or 1 byte) in length and contain the respective IP address, while the fifth subfield (e.g., $P_a$) contains a prefix for determining which portion of the IP address corresponds to the subnet. Server 222 loads the IP address bearer option 420 with the IP address(es) and subnet(s) being proffered to the respective switch 214. The IP address bearer option 420 can include multiple IP addresses and corresponding subnets so that the server may offer more than one IP address and subnet for assignment to the corresponding interface.

If multiple IP addresses and subnets are being enclosed within the DHCPOFFER message, the your_IP_address field 118 is loaded with the "primary" IP address to be used with the respective interface. The primary IP address is also loaded into one of the IP/Subnet_pair fields 426 (along with its corresponding prefix), since the your_IP_address field 118 lacks space for a corresponding prefix. The remaining IP/Subnet_pair fields 426 of option 420 are loaded with "secondary" IP addresses and their corresponding prefixes for assignment to the requesting interface.

The DHCPOFFER also includes a third novel option, identified as a routing parameter option. FIG. 4C is a block diagram of a preferred routing parameter option 430, which includes a plurality of fields. In particular, the routing parameter option 430 includes a code field 432, a length field 434, a protocol field 436 and a parameters field 438. The code field 432 contains a tag octet identifying the option as a routing parameter option. The protocol field 436 is preferably set by the server to a value associated with a particular routing protocol. For example, if field 436 is, set to "0" no routing protocol is assigned. If the field 436 is set to "1" the Open Shortest Path First (OSPF) protocol is assigned. Similarly, a "2" signifies the Routing Information Protocol, version 1 (RIPv1) and a "3" signifies the Routing Information Protocol, version two (RIPv2). The identified routing protocol is implemented by the layer 3 switch on the respective subnetwork. The parameter field 438 contains additional information, if any, associated with the protocol identified in field 436, such as the corresponding OSPF area.

The DHCPOFFER message is received by switch 214 which selects the information, as indicated by block 324 (FIG. 3B). Specifically, the switch 214 generates and sends a DHCPREQUEST message to server 222, as indicated by block 326, which includes the request/reply option 400 with the same value (e.g., "1") loaded in the corresponding type field 406. The DHCPREQUEST also contains the selected IP address in the client_IP_address field 116. If multiple IP addresses are involved, the "primary" IP address provided by the chosen server is loaded into the client_IP_address field 116. Server 222 similarly returns a DHCPACK message to the switch 214, as indicated by block 328, repeating the previously provided configuration parameters. Upon receipt of the DHCPACK message, the switch 214 commits its configuration of the respective interface, as indicated by block 330. The switch 214 also starts the DHCP relay process on the configured interface. These steps are repeated for each interface having connectivity to servers 220, 222.

Switch 214 has now been configured with a ROUTER-ID and IP configuration parameters for each of its interfaces that provide connectivity to the enhanced DHCP servers 220, 222. Next, the switch 214 proceeds to configure those interfaces coupled to subnetworks which lack connectivity to servers 220, 222, such as subnetworks 204 and 206.

Initially, switch 214 generates and broadcasts DHCPDISCOVER messages from these interfaces, as indicated by block 332 (FIG. 3C). This intermediary step is performed to ensure that no other layer 3 switch has allocated a subnet to this subnetwork while switch 214 was configuring its other interfaces. Assuming no DHCPOFFER messages are received, switch 214 "knows" that there is no alternative path from the respective subnetwork to an enhanced-DHCP server and that it is the first layer 3 device to provide network connectivity to the respective subnetwork, which has yet to be associated with any subnets.

Next, switch 214 generates and unicasts a DHCPDISCOVER message to a previously identified enhanced-DHCP server, such as server 222, as indicated by block 334. Any conventional server selection method may be employed. Embedded within the options field 130 of the DHCPDISCOVER message is the DHCP router extension option 400 whose type field 406 has been loaded with a new value (e.g., "2") to indicate that the switch 214 is making a subnet allocation request (i.e., a request for an IP subnet and corresponding IP address for an interface that does not represent a path to the DHCP server). To simultaneously request an IP subnet and address for multiple interfaces (e.g., subnetworks 204 and 206), switch 214 loads the number field 408 with a value (e.g., "2") corresponding to the requested number of IP subnets and addresses. The DHCPDISCOVER message is sent from the interface identified by the switch's routing table for reaching the particular server. In response, server 222 returns a DHCPOFFER message, as indicated by block 336, in which the router extension option 400, the IP address bearer option 420 and the routing parameter option 430 have each been embedded in the options field 130.

The your_IP_address field 118 of the DHCPOFFER message contains the proffered IP address for the respective interface or the first interface if multiple interfaces are involved. Furthermore, the relay_agent_address field 122 is loaded with the ROUTER-ID of the requesting switch 214 so that the portion of switch 214 that has already been configured may act as the relay agent for the remaining portions still seeking configuration. In addition, the type field 406 of option 400 is loaded with the same value (e.g., "2") signifying that the DHCPOFFER message is in response to the switch's request for IP configuration parameters for one or more interfaces lacking connectivity to the server. The IP address bearer option 420 contains the IP address and for each respective interface (e.g., subnetworks 204 and 206). The protocol field 436 of the routing parameter option 430 is loaded with a value corresponding to the routing protocol to be used on the corresponding subnetworks.

The DHCPOFFER message is received at switch 214 and its contents are examined. Again, if switch 214 receives a DHCPOFFER message without options 400, 420 and 430, the message is discarded. In response, switch 214 selects the offer and sends a DHCPREQUEST message to server 222 repeating the proffered configuration parameters, as indicated by blocks 338 and 340. Again, the DHCPREQUEST contains a request/reply option 400 with the same value (e.g., "2") loaded in the type field 406. Server 222 similarly replies with a DHCPACK message, as indicated by block 342, thereby allowing switch 214 to commit its configuration of the respective interfaces, as indicated by block 344. At this point, each requesting interface of switch 214 has been auto-configured with IP configuration parameters without any intervention by the network administrator. In particular, each requesting interface of switch 214 has received at least one IP address with a corresponding lease time. To obtain multiple subnets for a given interface (e.g., subnetwork 206), switch 214 may send a dedicated DHCPDISCOVER for the given interface requesting the assignment of multiple subnets through the number field 408 of option 400.

It should be understood that the particular values entered into the type field 406 of the router extension request/reply option 400 or the protocol field 436 of the routing parameter option 430 may vary provided that the foregoing requests/replies are consistently associated with the selected values. For example, the DHCPDISCOVER and DHCPREQUEST messages associated with a request for a ROUTER ID may be loaded with the value "0", whereas the corresponding DHCPOFFER messages may be loaded with the value "1". Similarly, the DHCPDISCOVER and DHCPREQUEST messages associated with a request for configuration of an interface providing connectivity to the server may be loaded with the value "2", whereas the corresponding DHCPOFFER messages may be loaded with the value "3" and so on. It should be further understood that the options 400, 420 and 430 may have other formats including additional fields or may be combined within a single option.

It should be further understood that a system administrator may manually configure a layer 3 switch's ROUTER-ID. In this case, after enabling its un-numbered interfaces, the layer 3 switch would proceed with auto-configuring its IP interfaces coupled to the various subnetworks as described above.

Since two or more layer 3 switches coupled to the same subnetwork may allocate different subnets to the subnetwork due to faults or crashes, switches preferably implement a reconciliation process. The reconciliation process corrects the assignment of multiple subnets by merging the two or more subnets into a single subnet and transferring all network addresses to the single subnet. The reconciliation process may be performed periodically or in response to a first switch receiving an advertisement on a given subnetwork that the subnetwork is also accessible through a second switch by a subnet unknown to the first switch.

In the preferred embodiment, the enhanced DHCP servers 220, 222 also allocate all IP addresses for hosts residing on subnetworks whose corresponding layer 3 switch interfaces were configured by the server. In particular, auto-configurable switches preferably associate each IP subnet assigned to their interfaces with the IP address of the server that provided the IP address from the respective subnet. When switches receive DHCPDISCOVER messages from hosts on a subnetwork coupled to an auto-configured interface, the switch inserts its IP address assigned to that interface in the relay_agent_address field 122 so that all DHCPOFFER messages are relayed through the switch. Additionally, the switch unicasts the host-generated DHCPDISCOVER messages to the server associated with the respective subnet.

In a conventional implementation of DHCP, router IP addresses are manually configured by the network administrator. As part of the host configuration process, moreover, conventional DHCP servers obtain these addresses and provide them to hosts as "first hop" gateway routers. With the IP addresses of layer 3 switches being auto-configured, enhanced DHCP servers preferably monitor the configuration of layer 3 IP addresses so that this information (i.e., first hop gateway router address) may still be provided to hosts during their configuration process by the enhanced DHCP servers.

The present invention also supports auto-configuration of switches, such as switch 212, that are coupled to the network 200 only through a point-to-point link, such as link 218. In particular, when a DHCPDISCOVER or a DHCPREQUEST message from switch 212 is received at switch 214, the DHCP relay process of switch 214 loads the client_hardware_address field 124 of the respective message with the Management Information Base, version two (MIB-II) ifIndex value associated with the point-to-point interface at switch 214. Additionally, switch 214 sets the hardware_type field 104 to "20" and the hardware_address_length field 106 to "4" indicating a serial line and loads the relay_agent_address field 122 with the IP address associated with its loop-back interface 224. When DHCPOFFER or DHCPACK messages are received at switch 214 with the ifIndex value loaded in the client_hardware_address field 124, switch 214 forwards the message over the respective interface to switch 212.

Updating/Renewing Existing IP Configuration Parameters

In the preferred embodiment, auto-configurable switches save their committed IP configuration parameters in a portion of non-volatile memory. That is, the switch's ROUTER-ID and the IP addresses, subnets and leases associated with each interface are preferably maintained in non-volatile memory. Thus, when the layer 3 switch is re-booted or a particular interface is re-initialized, the switch may simply confirm the previously obtained IP configuration parameters, rather than re-acquire such parameters from scratch. Specifically, upon re-initialization of a specific switch interface, the switch generates and sends a DHCPREQUEST message to an enhanced DHCP server whose address was also stored in non-volatile memory.

The DHCPREQUEST message is loaded with the information that the switch wishes to confirm for the specific interface. In particular, the IP address which the switch is seeking to re-validate is loaded into the client_IP_address field 116 of the message and the lease time is placed in an option embedded within the options field 130. The switch also embeds a router extension option 400 loaded for the corresponding interface as described above within options field 130. In return, the switch may receive a DHCPACK from the server confirming the requested configuration. Alternatively, the switch may receive a DHCPNACK message from the server, causing the switch to discard the previously stored information and proceed with the configuration process as described above.

An auto-configurable switch preferably extends its lease on a given IP address in a conventional manner as provided by the DHCP protocol. In addition, an auto-configurable switch preferably does not transmit DHCPRELEASE messages, which are used by hosts to relinquish an IP address prior to the expiration of its lease. Since relinquishment of an IP address by a layer 3 switch may result in a particular subnetwork losing connectivity, an auto-configurable switch preferably does not issue such messages.

Forcing a Re-Configuration

If a server 220, 222 determines that a subnet assigned to an auto-configurable switch is becoming full as explained below or a network manager wishes to re-number a switch interface, the switch is preferably forced to re-configure itself. In particular, the server may send a ROUTER RECONFIG message to the affected switch. The ROUTER RECONFIG message preferably has the same format as a conventional DHCP message as illustrated in FIG. 1. The ROUTER RECONFIG message, however, has a new, previously un-assigned value loaded in the DHCP message type option 132 that identifies it as a ROUTER RECONFIG message as opposed to a conventional DHCP message. The ROUTER RECONFIG message essentially results in early termination of the lease for the interface corresponding to the address loaded in the your_IP_address field 118 of the message. In response, the switch preferably proceeds to re-configure the affected interface as discussed below.

Automatic Subnet Re-Sizing

Each enhanced DHCP server 220, 222 also monitors the IP address utilization of entities located on the subnets it has assigned. If the utilization exceeds a pre-configured upper limit (e.g., 40%) of capacity or drops below a lower limit (e.g., 10%), the server preferably allocates a new subnet to replace the existing one. In the preferred embodiment, the new subnet is different in size by a factor of two. For example, if the utilization of a given subnet exceeds 40%, the server preferably allocates a new subnet that is twice the size of the original subnet. Similarly, if the utilization drops below the lower limit, the server preferably allocates a new subnet that is half the size of the original subnet. The server then proceeds to assign new IP addresses from the new subnet to all entities located on the original subnet. At any point in time during this re-assignment process, however, a given subnetwork may be associated with two or more subnets each having a different size. Accordingly, to support continued message routing during re-assignment, all switches within the network 100 (not just auto-configurable switches) implement a routing protocol that supports variable length subnet masks, such as OSPF.

Figure 5:
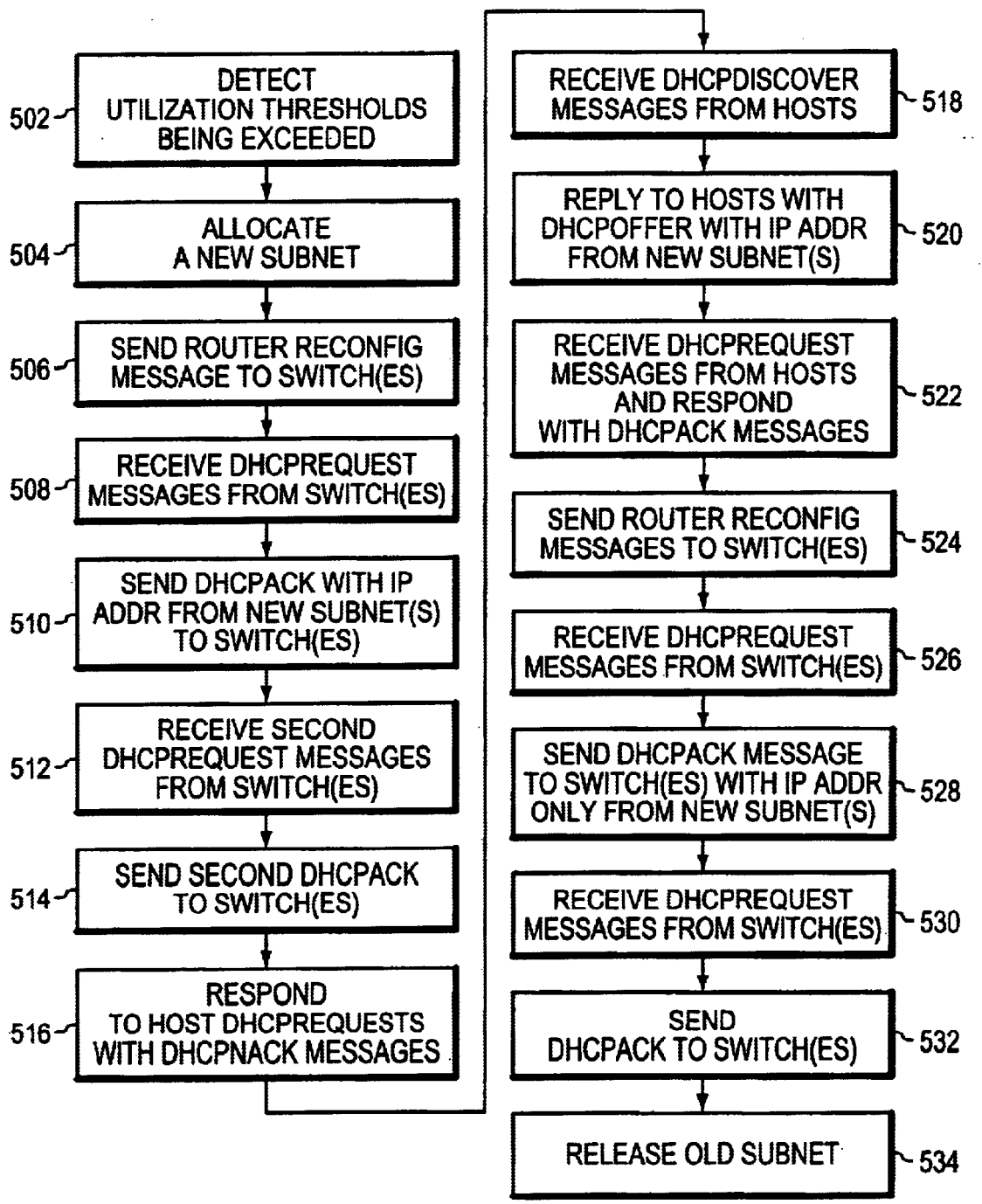
FIG. 5 is a flow diagram of the preferred method to re-size a subnet.

FIG. 5 is a flow diagram of the steps of the re-assignment process. As shown at block 502, the server first detects that subnet utilization has exceeded the pre-configured thresholds. In response, the server allocates a new subnet that is either twice or half the size of the original subnet depending on whether the upper or lower threshold was exceeded, as indicated by block 504. Next, the server sends a ROUTER RECONFIG message to each auto-configurable switch having an interface coupled to the affected subnetwork, as shown at block 506. The ROUTER RECONFIG message is preferably addressed to the switch's ROUTER-ID, but contains the affected interface address in the your_IP_address field 118. In response, each switch issues a DHCPREQUEST message, as described above, seeking to renew its current IP configuration parameters.

The DHCPREQUEST messages are received at the server, as indicated at block 508. By examining the contents of the DHCPREQUEST message, the server determines which ROUTER RECONFIG message is being responded to. The server sends a DHCPACK message containing an IP address from the newly allocated subnet, as indicated at block 510, in addition to re-validating its old address. Each switch responds with a second DHCPREQUEST message repeating the new configuration parameters that is received at the server, as indicated by block 512, and :the server responds with another DHCPACK, as shown at block 514. At this point the respective interface for each layer 3 switch is associated with at least two IP addresses, one corresponding to the original subnet and the other corresponding to the newly allocated subnet. When a new subnet has been allocated and new IP addresses provided to the layer 3 switches, the switches preferably make the new IP addresses "primary" addresses and the old address(es) "secondary". During this process, the server preferably continues to renew leases to the old subnet that have been assigned to both hosts and auto-configurable switches.

Once the auto-configurable switches have each been assigned an address from the newly allocated subnet, the server stops renewing leases to old subnet addresses assigned to hosts by responding to such lease renewal requests with DHCPNACK messages, as indicated by block 516. In the conventional manner, the DHCPNACK message informs the host that the IP parameters it seeks to renew are no longer valid and that the host must restart the configuration process. Accordingly, the server next receives DHCPDISCOVER messages from these hosts, as shown by block 518, and replies with DHCPOFFER messages containing IP addresses from the new subnet, as indicated by block 520. The servers will next receive DHCPREQUEST messages from the hosts which are responded to with DHCPACK messages, as shown at block 522. At this point, all of the hosts on the affected subnetwork will have a single set of IP configuration parameters from the newly allocated subnet.

The server now stops renewing leases on IP addresses assigned to any layer 3 switches that are associated with the old subnet. The server also sends a second ROUTER RECONFIG message to each layer 3 switch still maintaining an IP address on the old subnetwork, as indicated by block 524. In response, each layer 3 switch sends a DHCPREQUEST message containing its current IP configuration, which is received at the server, as indicated by block 526. The server replies with a DHCPACK message that only confirms the IP address from the newly allocated subnet, thereby informing the layer 3 switch to discard the IP address associated with the old subnet, as shown by block 528. The switches respond with a second DHCPREQUEST message that repeats only the IP address from the newly allocated subnet.

These DHCPREQUEST messages are received at the server which responds with another DHCPACK, as shown at blocks 530, 532. At this point, all of the hosts and all of the auto-configurable switches are utilizing IP addresses from the newly allocated subnet. None of the devices have an IP address associated with the old subnet. The old or demoted subnet, moreover, is now released for reassignment or re-allocation to another subnetwork, as indicated by block 534.

It should be understood that rather than automatically re-sizing the affected subnet, a server may contact a network administrator upon the detection of a threshold being exceeded. The network manager may then manually select a new subnet and reconfigure the affected devices. Alternatively, the network manager may direct the server to allocate a new subnet and assign new IP addresses, as described above, during non-business or off-peak hours to minimize any disruption to the hosts. In this case, the network manager may be notified prior to the thresholds actually being exceeded. That is, if the network administrator has requested notice, the server may establish sub-thresholds, which, when exceeded, cause the server to notify the network administrator. If the server does not receive any instructions from the network administrator before the primary thresholds are exceeded, the server preferably proceeds to automatically re-size the affected subnet as necessary.

It should also be understood that servers and/or layer 3 devices may associate timers with the sending of various messages so that subsequent steps, such as re-sending a given message, may be performed if a proper response is not received before expiration of the associated timer.

It should be further understood that servers and layer 3 switches may perform the previously described auto-configuration steps without also supporting the automatic allocation and re-sizing of new subnets.

The foregoing description has been directed to specific embodiments of this invention. It will be apparent, however, that other variations and modifications may be made to the described embodiments, with the attainment of some or all of their advantages. For example, rather than utilize novel options, new DHCP message types, having a format similar to the message of FIG. 1, may be utilized to perform the described auto-configuration process. In particular, a ROUTER_DHCPDISCOVER message may be created by utilizing a new value in the message type option 132. New ROUTER_DHCPOFFER, ROUTER_DHCPREQUEST and ROUTER_DHCPACK messages may similarly be created similar to the message of FIG. 1, but each having a new value loaded in the corresponding message type option 132. Alternatively, the new messages may omit certain fields, such as the op field 102, xid field 110, secs field 112, flags field 114, sname field 126 and/or file field 128. Another embodiment may utilize a completely different message format from that disclosed in FIG. 1, although still capable of exchanging the above-described information. The present invention may also be utilized with other network layer protocols, such as IP version 6, whose addresses are 128 bits long. Therefore, it is the object of the appended claims to cover all such variations and modifications as come within the true spirit and scope of the invention.

What is claimed is:

1. A method for auto-configuring at least one layer three device in a computer network with Internet Protocol (IP) parameters, including one or more IP addresses, the at least one layer three device having a plurality of interfaces, one or more interfaces representing a logical connection to the network and the network including at least one server in communicating relationship with the at least one layer three device, the method comprising the steps of:

broadcasting a discover message from the at least one layer three device, the discover message indicating that the at least one layer three device is requesting assignment of an overall IP address to the plurality of interfaces of the at least one layer three device;

sending an offer message, in response to the discover message, from the server to the at least one layer three device, the offer message including a proffered IP address for use as the overall IP address;

sending a request message, in response to the offer, from the layer three device to the server, the request message indicating that the at least one layer three device has accepted the proffered overall IP address;

sending an acknowledgment, in response to the request message, from the server to the layer three device, confirming receipt of the request message; and committing the accepted overall IP address to the plurality of interfaces of the at least one layer three device in response to the acknowledgment.

2. A method for auto-configuring at least one layer three device in a computer network with Internet Protocol (IP) parameters, including one or more IP addresses, the at least one layer three device having a plurality of interfaces, one or more interfaces representing a logical connection to the network and the network including at least one server in communicating relationship with the at least one layer three device, the method comprising the steps of:

broadcasting a second discover message only from an interface of the at least one layer three device that provides connectivity via the network to the server, the second discover message indicating that the at least one layer three device is requesting assignment of one or more IP addresses for the respective interface;

sending a second offer message, in response to the second discover message, from the server to the at least one layer three device, the second offer message including one or more proffered IP addresses for assignment to the respective interface;

sending a second request message, in response to the second offer, from the layer three device to the server, the second request message indicating that the at least one layer three device has accepted the proffered one or more IP addresses for the respective interface;

sending a second acknowledgment, in response to the second request message, from the server to the layer three device, confirming receipt of the second request message; and committing the accepted IP address at the respective interface of the at least one layer three device in response to the second acknowledgment.

3. A method for auto-configuring at least one layer three device in a computer network with Internet Protocol (IP) parameters, including one or more IP addresses, the at least one layer three device having a plurality of interfaces, one or more interfaces representing a logical connection to the network and the network including at least one server in communicating relationship with the at least one layer three device, the method comprising the steps of:

broadcasting a third discover message only from an interface of the at least one layer three device that provides connectivity via the network to the server, the third discover message indicating that the at least one layer three device is requesting assignment of one or more IP addresses for an interface lacking connectivity to the server;

sending a third offer message, in response to the third discover message, from the server to the at least one layer three device, the third offer message including at least one or more proffered IP addresses for assignment to the interface lacking connectivity to the server;

sending a third request message, in response to the third offer, from the layer three device to the server, the third request message indicating that the at least one layer three device has accepted the proffered one or more IP addresses for the interface lacking connectivity to the server;

sending a third acknowledgment, in response to the third request message, from the server to the layer three device, confirming receipt of the third request message; and committing the accepted IP address at the interface lacking connectivity to the server of the at least one layer three device in response to the third acknowledgment.

4. The method of claim 1 wherein the discover message includes a first option that is marked by the at least one layer three device to indicate that it is requesting assignment of the overall IP address.

5. The method of claim 4 wherein the offer message includes the first option marked by the server to indicate that the proffered IP address is the overall IP address.

6. The method of claim 2 wherein the second discover message includes a first option marked by the at least one layer three device to indicate that it is requesting assignment of one or more IP addresses for the respective interface.

7. The method of claim 6 wherein the second offer message includes a first option marked by the server to indicate that the proffered one or more IP addresses are for use with the respective interface.

8. The method of claim 3 wherein the third discover message includes a first option marked by the at least one layer three device to indicate that it is requesting assignment of one or more IP addresses for the interface lacking connectivity to the server.

9. The method of claim 8 wherein the third offer message includes a first option marked by the server to indicate that the one or more proffered IP addresses are for use with the interface lacking connectivity to the server.

10. The method of claim 6 wherein the second offer message includes a second option containing each proffered IP address and its associated subnet mask for the respective interface.

11. The method of claim 10 wherein the second offer includes a third option identifying the routing protocol to be used by the layer three switch with the respective interface.

12. The method of claim 9 wherein the third offer message includes a second option containing each proffered IP address and its associated subnet mask for the interface lacking connectivity to the server.

13. The method of claim 12 wherein the third offer includes a third option identifying the routing protocol to be used by the layer three switch with the interface lacking connectivity to the server.

14. The method of claim 13 wherein the third offer includes, for each proffered IP address, a corresponding lease time indicating the life of the respective proffered IP address.

15. The method of claim 1 wherein the server proffers the overall IP address from a pre-configured cache of available IP addresses stored at the server each having a pre-defined prefix.

16. An option embedded within one or more messages exchanged between a layer three device and a server connected to a computer network for auto-configuring the layer three device with Internet Protocol (IP) configuration parameters, including at least an IP address, the layer three device having a plurality of interfaces each representing a logical connection to the computer network, the option being stored at a memory of either the layer three device or the server, the option comprising:

a code field containing a predefined octet indicating that the option is for use in auto-configuring the layer three device; and a type field which is loaded by the layer three device or server sending the message in which the option is embedded, wherein the type field is loaded with a first value by the layer three device to indicate that the corresponding message is a request for assignment of an overall IP address or with a second value loaded by the server to indicate that the corresponding message contains a proffered overall IP address for use with the plurality of interfaces of the layer three device.

17. The option of claim 16 wherein the type field further may be loaded with a third value by the layer three device to indicate that the corresponding message is a request for assignment of one or more IP addresses for an interface having connectivity to the server or a fourth value by the server to indicate that the corresponding message contains one or more proffered IP addresses for assignment to the interface having connectivity to the server.

18. The option of claim 17 wherein the type field further may be loaded with a fifth value by the layer three device to indicate that the corresponding message is a request for assignment of one or more IP addresses for an interface lacking connectivity to the server or a sixth value by the server to indicate that the corresponding message contains one or more proffered IP addresses for assignment to the interface lacking connectivity to the server.

19. An option embedded within one or more messages exchanged between a layer three device and a server connected to a computer network for auto-configuring the layer three device with Internet Protocol (IP) configuration parameters, including at least an IP address, the layer three device having a plurality of interfaces each representing a logical connection to the computer network, the option being stored at a memory of either the layer three device or the server, the option comprising:

- a code field containing a predefined octet indicating that the option is for use in auto-configuring the layer three device; and
- one or more IP address/subnet fields, each IP address/subnet field containing a proffered IP address and its corresponding subnet for use on a given interface of the layer three device.

20. An option embedded within one or more messages exchanged between a layer three device and a server connected to a computer network for auto-configuring the layer three device with Internet Protocol (IP) configuration parameters, including at least an IP address, the layer three device having a plurality of interfaces each representing a logical connection to the computer network, the option being stored at a memory of either the layer three device or the server, the option comprising:

- a code field containing a predefined octet indicating that the first option is for use in auto-configuring the layer three device; and
- a protocol parameter field containing a value identifying a specific routing protocol for use on a given interface of the layer three device.

21. A layer three device for connection to a computer network having at least one server, the layer three device having a plurality of interfaces each representing a logical connection to the computer network, the layer three device comprising:

- a message transmitter connected to the computer network; and
- a message receiver connected to the computer network, wherein the message transmitter is configured and arranged to formulate and broadcast a discover message requesting assignment of an overall IP address, the message receiver is configured and arranged to receive and examine an offer sent by the at least one server, that includes a proffered IP address for use with the plurality of interfaces of the layer three device as an overall IP address, the message transmitter is further configured and arranged to formulate and send to the server a request message, in response to the offer, indicating that the layer three device has accepted the proffered overall IP address and the message receiver is further configured and arranged to receive and examine an acknowledgment from the at least one server that confirms its receipt of the request message.

22. A method for automatically assigning a new subnet to a subnetwork having an existing subnet, the subnetwork including one or more layer three devices and a plurality of hosts, the method comprising the steps of:

- monitoring the utilization of the existing subnet by the subnetwork;
- determining whether the utilization of the existing subnet exceeds one or more predefined thresholds;
- in response to the step of determining, allocating a new subnet for use by the subnetwork;
- assigning at least one Internet Protocol (IP) address from the newly allocated subnet to each of the one or more layer three switches;
- assigning an IP address from the newly allocated subnet to each host that issues a request to renew its IP address;
- forcing any hosts that have not been assigned an IP address from the newly allocated subnet to discard their original IP address and request a new IP address; and
- in response to the forcing step, assigning an IP address from the newly allocated sub-net to each host that was forced to discard its original IP address.

* * * * *